United States Patent [19]

Fujiguchi et al.

[11] Patent Number: 5,306,767
[45] Date of Patent: Apr. 26, 1994

[54] FILLED POLYCARBONATE RESIN COMPOSITION

[75] Inventors: Tomohide Fujiguchi; Hideyuki Itoi; Akihiro Saito, all of Utsunomiya, Japan

[73] Assignee: GE Plastics Japan, Ltd., Tokyo, Japan

[21] Appl. No.: 942,900

[22] Filed: Sep. 10, 1992

[30] Foreign Application Priority Data

Sep. 17, 1991 [JP] Japan .................................. 3-262507

[51] Int. Cl.$^5$ ...................... C08L 67/03; C08L 69/00
[52] U.S. Cl. .................................. 524/604; 524/537; 524/539; 524/540; 524/601
[58] Field of Search ............... 524/604, 601, 537, 539, 524/540

[56] References Cited

U.S. PATENT DOCUMENTS 3,998,908 12/1976 Buxbaum ........................... 524/604
4,927,903 5/1990 Schreckenberg et al. .......... 528/176

FOREIGN PATENT DOCUMENTS 2135792 4/1985 European Pat. Off. .
2272417 6/1988 European Pat. Off. .
2434998 7/1991 European Pat. Off. .

Primary Examiner—Harold D. Anderson

[57] ABSTRACT

The object of this invention is to provide polycarbonate resin compositions.

(A) 30-80 parts by weight of a copolyester carbonate containing constituent units having the formula:

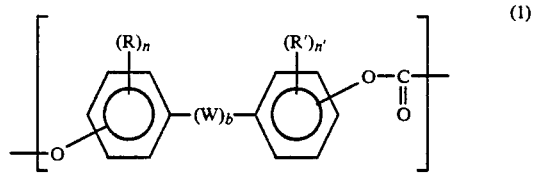

and the formula:

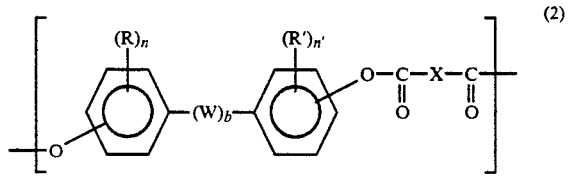

(where R and R' independently represent halogen atoms, monovalent hydrocarbon groups or hydrocarbonoxy groups; W is a divalent hydrocarbon group, —S—, —S—S—, —O—, —S(=O)—, —(O=)S(=O)— or —C(=O); n and n' independently represent integers from 0 to 4; X is a divalent aliphatic group having 6-18 carbons; and b is 0 or 1) or this and a polycarbonate resin, and
(B) 70-20 parts by weight of aromatic polyester resin, and which contains also:
(C) 60-1 parts by weight of inorganic filler per 40-99 parts of (A)+(B).

3 Claims, No Drawings

FILLED POLYCARBONATE RESIN COMPOSITION

DETAILED DESCRIPTION OF THE INVENTION

1. Field of the Invention

The present invention relates to polycarbonate resin compositions. More specifically, it relates to polycarbonate resin compositions having an excellent appearance, good chemical resistance and moldability, and excellent physical properties.

2. Technical Background of the Invention

Because polycarbonate resins have excellent heat resistance and impact resistance, they are used in a broad range of applications as engineering plastics; in addition, many resin compositions in which these are combined with other resins are also known.

Because aromatic polyester resins have excellent mechanical properties and moldability, many resin compositions in which these have been formulated into polycarbonate resins are used. It has hitherto been known that when inorganic fillers such as glass fibers are formulated into polycarbonate/polyester resin compositions such as these, they greatly enhance the rigidity.

3. Problems the Invention Sets Out to Resolve

However, because a good appearance is difficult to obtain with this kind of resin composition, it has been impossible to use these in applications where appearance is of much importance, such as decorative products, office automation equipment, and exterior trim in automobiles.

Thus, the object of the present invention is to provide a polycarbonate resin composition having an improved appearance, and excellent chemical resistance, moldability and physical properties.

4. Means for Resolving the Problems

The present invention provides resin compositions containing:

(A) 30-80 parts by weight of a copolymer carbonate containing constituent units having the formula:

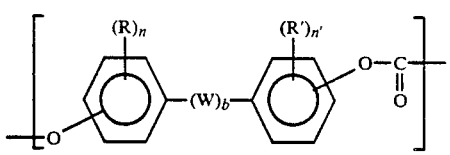

and the formula:

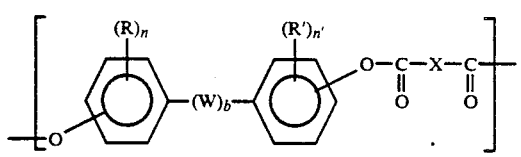

(where R and R' independently represent halogen atoms, monovalent hydrocarbon groups or hydrocarbonoxy groups; W is a divalent hydrocarbon group, —S—, —S—S—, —O—, —S(=O)—, —(O=)S(=O)— or —C(=O); n and n' independently represent integers from 0 to 4; X is a divalent aliphatic group having 6-18 carbons; and b is 0 or 1), or this and a polycarbonate resin, and (B) 70-20 parts by weight of aromatic polyester resin, and which contains also:

(C) 60-1 parts by weight of inorganic filler per 40-99 parts of (A)+(B).

The copolyester carbonate used in the present invention must have the constituent units represented by above Formulas 3 and 4. The constituent units represented by Formula 3 consist of a diphenol component and a carbonate component. Diphenols that can be used to introduce the diphenol component are diphenols having Formula 5:

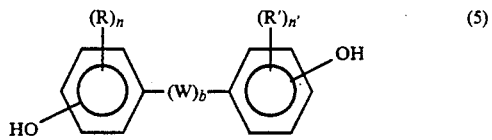

(where R, R', W, b, n and n' mean the same as above). Here, if R and R' are halogen atoms, these may be, for example, chlorine atoms or bromine atoms. If these are monovalent hydrocarbon groups, examples that may be cited include alkyls with 1-12 carbons such as methyl, ethyl, propyl or decyl; cycloalkyls with 4-8 carbons such as cyclopentyl or cyclohexyl; aryls with 6-12 carbons such as phenyl, naphthyl or biphenyl; aralkyls with 7-14 carbons such as benzyl or cinnamyl; or alkaryls with 7-14 carbons such as tolyl or cumenyl. The use of alkyl groups is preferable. Examples of hydrocarbonoxy groups such as this include alkoxy groups, cycloalkyloxy groups, aryloxy groups, aralkyloxy groups or alkaryloxy groups; the use of alkoxy groups and aryloxy groups is preferable.

In cases where W is a divalent hydrocarbon group, this may be an alkylene group having 1-30 carbons, such as methylene, ethylene, trimethylene or octamethylene; an alkylidene group having 2-30 carbons such as ethylidene or propylidene; a cycloalkylene group having 6-16 carbons such as cyclohexylene, cyclododecylene; or a cycloalkylidene group such as cyclohexylidene.

Examples that may be cited of effective diphenols in this invention include 2,2-bis(4-hydroxyphenyl)propane (known as bisphenol A), 2,2-bis(3,5-dibromo-4-hydroxyphenyl)propane, 2,2-bis(3,5-dimethyl-4-hydroxyphenyl)propane, 1,1-bis(4-hydroxyphenyl)cyclohexane, 1,1-bis(3,5-dimethyl-4-hydroxyphenyl)cyclohexane, 1,1-bis(4-hydroxyphenyl)decane, 1,4-bis(4-hydroxyphenyl)propane, 1,1-bis(4-hydroxyphenyl)cyclododecane, 1,1-bis(3,5-dimethyl-4-hydroxyphenyl)cyclododecane, 4,4-dihydroxydiphenylether, 4,4-thiodiphenol, 4,4-dihydroxy-3,3-dichlorodiphenylether and 4,4-dihydroxy-2,5-dihydroxydiphenylether. In addition, the diphenols cited in U.S. Pat. Nos. 2,999,835, 3,028,365, 3,334,154 and 4,131,575 can also be used.

Examples that may be cited of precursors for introducing the carbonate component include phosgene and diphenylcarbonate.

Next, the constituent units represented by Formula 4 consist of a diphenol component and a divalent acid component. The same diphenols as those cited above can be used to introduce the diphenol component. The monomers used to introduce the divalent acid component are divalent acids or equivalent substances thereof. Examples of the divalent acid include fatty diacids having 8-20 carbons, and preferably 10-12 carbons. This divalent acid or its equivalent substance may be straight-chain, branched, or cyclic. α,ω-Dicarboxylic acids are desirable as the fatty diacids. Preferable examples of these divalent acids include straight-chain saturated aliphatic dicarboxylic acids such as sebacic acid (decanedioic acid), dodecanedioic acid, tetradecanedioic acid, octadecanedioic acid and icosandioic acid, with sebacic acid and dodecanedioc acid being especially desirable. Equivalent substances that may be cited include, for example, the acid chlorides or other acid halides, or the diphenyl esters or other aromatic esters, of the above-mentioned divalent acids. The above divalent acid or its equivalent substance may be used alone or as a combination of two or more thereof.

In the above-mentioned copolyester carbonates, the two constituent units represented by Formulas 3 and 4 may be present in any ratio, although the ratio of Formula 4 units should be at least 2 mol %, and preferably at least 7 mol %. When the proportion represented by the Formula 4 units becomes large, the refractivity of the copolyester carbonate approaches that of glass, which is desirable.

The weight-average molecular weight of the copolyester carbonate is generally 10,000–100,000, and preferably 18,000–40,000. The weight-average molecular weight referred to here is measured by means of gel permeation chromatography (GPC) using a polystyrene corrected for polycarbonate use. The intrinsic viscosity, as measured at 25° C. in methyl chloride, should be 0.35–0.65.

The copolyester carbonate can be produced, for example, by means of a known interfacial polymerization process or a melt polymerization process that uses phosgene. For example, production is possible by means of the methods cited in the specification of U.S. Pat. Nos. 4,238,596 (granted to Quinn) and 4,238,597 (granted to Markezich). More specifically, first an acid halide is formed prior to the reaction between the ester-forming group and the diphenol, then this is reacted with phosgene. In Goldberg's basic solution process (specification of U.S. Pat. No. 3,169,121), a pyridine solvent or a dicarboxylic acid can be used. A A melt polymerization process that uses a diester (e.g., the diphenyl ester) of an α,ω-dicarboxylic acid (such as sebacic acid) may also be used. A preferable method of production is Kochanowski's modified process in U.S. Pat. No. 4,286,083. In this method, a lower diacid such as adipic acid is first rendered into the form of a salt (preferably an alkali metal salt such as the sodium salt), then this is added to a reaction vessel containing a diphenol. During reaction with phosgene, the aqueous phase is maintained at an alkaline pH of preferably pH 8-9; at a point where a minimum of about 5% of the reaction with phosgene remains, the pH is increased to 10-11.

In cases involving an interfacial polymerization process such as the bischloroformate process, it is desirable to use a general catalyst system that is well known in polycarbonate and copolyester carbonate synthesis. Examples that may be cited of the main catalyst system include amines such as tertiary amine, amidine or guanidine. Tertiary amines are generally used; of these, the use of a trialkylamine such as triethylamine is especially desirable.

Copolyester carbonates have an adequate impact strength even when they have a phenol group on the end. However, when a bulkier end group such as p-t-butyl-phenol, isononylphenol, isooctylphenol, m- or p-cumylphenol (preferably p-cumylphenol) or a chromanyl compound such as chroman is introduced onto this, a copolyester carbonate having better low-temperature impact properties can be obtained.

In the present invention, a polycarbonate resin can also be used as component (A) in addition to the above-described copolyester carbonate. Known polycarbonate resins may be used; these normally consist of a diphenol component and a carbonate component. Examples of the diphenol component that may be cited include diphenol components derived from diphenols represented by above Formula 5. Specific examples of diphenols that may be cited are the diphenols mentioned earlier in regard to the copolyester carbonate. This type of polycarbonate can be produced, for example, by a known interfacial polymerization or melt polymerization process that uses phosgene.

The polycarbonate may be branched. This type of branched polycarbonate can be obtained as a branched thermoplastic random branched polycarbonate by reacting a polyfunctional aromatic compound with a diphenol and/or a carbonate precursor.

Component (A) may consist of this type of polycarbonate resin used in a ratio of 0–95 parts by weight per 5–100 parts by weight of the above-described copolyester carbonate. When the ratio of polycarbonate resin exceeds 95 parts by weight, the molded product appearance-improving effect is inadequate.

Next, the aromatic polyester resin used in this invention is a polymer or copolymer that is itself known and can be obtained by means of a polycondensation reaction in which an aromatic dicarboxylic acid (or an ester-forming derivative thereof) and a diol (or an ester-forming derivative thereof) serve as the main components).

Examples that may be cited of this aromatic dicarboxylic acid component include dicarboxylic acids having a benzene nucleus such as terephthalic acid, isophthalic acid or o-phthalic acid, or their ester-forming derivatives; dicarboxylic acids containing a naphthalene nucleus such as naphthalene-1,5-dicarboxylic acid or naphthalene-2,7-dicarboxylic acid, or ester-forming derivatives thereof; and biphenyl-2,2'-dicarboxylic acid, biphenyl-3,3'-dicarboxylic acid, biphenyl-4,4'-dicarboxylic acid, diphenylether-4,4'-dicarboxylic acid, diphenylmethane-4,4'-dicarboxylic acid, diphenylsulfone-4,4'-dicarboxylic acid, diphenylisopropylidene-4,4'-dicarboxylic acid, 1,2-bis(phenoxy)ethane-4,4'-dicarboxylic acid, anthracene-2,5-dicarboxylic acid, anthracene-2,6-dicarboxylic acid, pterphenylene-4,4'-dicarboxylic acid and pyridine-2,5-dicarboxylic acid, or their ester-forming derivatives. Two or more aromatic dicarboxylic acids may be combined and used. Along with these aromatic dicarboxylic acids, a small amount of aliphatic dicarboxylic acids such as adipic acid, azelaic acid, dodecanedioic acid and sebacic acid or their ester-forming derivatives; or cyclic acids such as cyclohexanedicarboxylic acid or the ester-forming derivatives thereof may be used. One or more of these latter acids or their derivatives may be combined and used together.

Examples of the diol component that may be cited include glycols having the formula $HO(CH_2)_nOH$ (where n is an integer from 2 to 10), such as ethylene glycol, tetramethylene glycol and hexamethylene glycol; fatty diols such as propylene glycol, neopentyl glycol, 2-methylpropane-1,3-diol and diethylene glycol; alicyclic diols such as cyclohexanediol and cyclohexanedimethanol; diols that include aromatic rings such as 1,4-bisoxyethoxybenzene and bisphenol A, or ester-forming derivatives of these. Also, a small amount of one or more long-chain diols having a molecular weight of 400-6000, such as polyethylene glycol, poly-1,3-propylene glycol and polytetramethylene glycol may also be copolymerized.

Specific examples of aromatic polyester resins that may be cited include polyethylene terephthalate (PET), polypropylene terephthalate, polybutylene terephthalate (PBT), polyethylene naphthalate, polybutylene naphthalate, polyethylene-1,2-bis(phenoxy)ethane-4,4'-dicarboxylate, polycyclohexanedimethanol terephthalate, and polycyclohexanedimethanol isophthalate. Polybutylene terephthalates are preferable, with poly(1,4-butylene terephthalate) being especially preferable.

In cases where a copolymeric polyester is used as component (B) in this invention, this shall exclude mixtures of terephthalic acid and isophthalic acid, and copolyesters consisting of aliphatic or alicyclic diols.

The molecular weight of the aromatic polyester resin used in this invention should be such that the intrinsic viscosity, as measured at 30° C. in a 1:1 (weight ratio) mixture of phenol and tetrachloroethane, is at least 0.50, and preferably at least 0.55.

The above-mentioned aromatic polyester (B) is used in an amount of 20-70 parts by weight per 30-80 parts by weight of (A) copolyester carbonate, with the use of (B) in an amount of 30-50 parts by weight per 50-70 parts by weight of (A) being preferable. When the amount of (A) is less than 30 parts by weight, it is difficult to maintain excellent mechanical properties. When the amount of (B) is less than 20 parts by weight, the chemical resistance decreases, in addition to which the synergistic effects with copolyester carbonate that provide a good appearance are not manifested.

Examples that may be cited of the inorganic filler used as component (C) in the present invention include inorganic fibers and whiskers such as glass fibers, carbon fibers, graphite fibers, metal fibers, silicon carbide fibers, asbestos, wollastonite and fibrous potassium titanate. These may be used alone or as mixtures of two or more thereof. The use of glass fibers is preferable. It is preferable that the length/diameter ratio of the inorganic filler be 10-1000, and especially 50-500. The amount of component (C) used is 1-60 parts by weight per 40-99 parts by weight of (A)+(B), and preferably 5-30 parts by weight per 70-95 parts by weight of (A)+(B). When the amount in which inorganic filler (C) is used is less than one part by weight, the mechanical properties decrease; when this is more than 60 parts by weight, full use is not made of the properties of the resin.

Conventional additives such as pigments, dyes, heat-resisting agents, antioxidants, anti-weathering agents, lubricants, mold-release agents, crystal nucleating agents, plasticizers, flame retardants, flowability enhancers and antistatic agents may also be included in the resin composition of the present invention in accordance with the desired aim, provided they do not compromise the properties of the above-mentioned components.

There is no particular restriction on the method for producing the resin composition of this invention, it being possible to make satisfactory use of a conventional method. However, the use of a molten mixing method is generally desirable. Although the use of a small amount of solvent is possible, it is generally not necessary. Examples of the apparatus that may be cited include in particular extruders, Banbury mixers, rollers and kneaders; these may be operated either in a batchwise manner or continuously.

Because molded products obtained from the resin compositions of the present invention have a good appearance, in addition to conventional applications for polycarbonate/polyester resin compositions, they can be used in applications such as decorative products, office automation equipment and the exterior trim on automobiles.

EXAMPLES

The present invention shall now be illustrated more concretely through the following examples. The following components were used in these examples.

Component (A)

A polycarbonate (trade name, Lexan 131; made by GE Plastics Japan KK; a polycarbonate derived from bisphenol A and phosgene), referred to hereinafter as PC.

CPEC refers to the copolyester carbonate produced as follows.

The disodium salt of dodecanedioic acid (DDDA) was prepared by dissolving 7.2 g (31 mmol) of DDDA and 2.7 g (68 mmol) of NaOH tablets in 180 mL of water. Next, a 2000-mL Morton flask having a sample removal port at the bottom and having five necks at the top was equipped with an agitating blade, a pH probe, an injection tube, and a Claisen adapter with dry-ice condenser. This polymerization flask was charged with 71 g (311 mmol) of bisphenol A, 0.8 mL of triethylamine, 2.0 g (9 mmol) of p-cumylphenol, 220 mL of methylene chloride, and the disodium salt of DDDA produced above. Next, phosgene was poured into this flask at a rate of 2 g/min. At this time, the solution was maintained at pH 8 for 10 minutes while adding a 50% NaOH aqueous solution through the injection tube. After this, the pH of the solution was set at 10.5 by adding the 50% NaOH aqueous solution via the injection tube while continuing phosgene injection, then this pH was maintained for 10 minutes. The total amount of the phosgene used was 400 g (400 mmol). After reaction completion, the pH of the solution was adjusted to 11-11.5, and the organic solvent phase was separated from the aqueous phase. The organic solvent phase was washed three times with 300 mL of 2% hydrochloric acid, then was washed five times with 300 mL of ion-exchanged water, after which it was dried with anhydrous magnesium sulfate and filtered. This was poured into 1500 mL of methanol, and the polymer was precipitated. The polymer thus obtained was separated by filtration, washed once with 500 mL of methanol, then washed four times with 500 mL of ion-exchanged water, after which it was dried for 15 minutes at 110° C. A copolyester carbonate having constituent units with the following formulas (Formulas 6 and 7) in a molar ratio of 90:10 were thereby obtained. The intrinsic viscosity (as measured at 25° C. in methylene chloride) was 0.46. This shall be abbreviated hereinafter as CPEC.

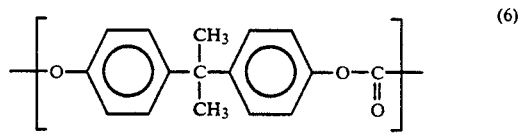

(6)

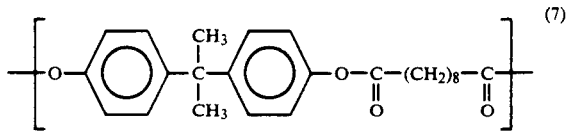

(7)

Component (B)

An aromatic polyester (a polybutylene terephthalate; trade name, Varox 310; produced by GE Plastics Japan KK), abbreviated hereinafter as PBT.

Component (C)

Glass fiber (trade name, CS-3J-941SP; made by Nitto Boseki KK; length/diameter ratio, 300; fiber length, 3 mm).

Optional Components

Carbon black (used as a coloring agent).

EXAMPLES 1–3, COMPARATIVE EXAMPLES 1–2

The respective components in the amounts indicated in Table 1 (parts by weight) were mixed in a Henschel mixer, then extruded at 270° C. with a 65-mm single-screw extruder to form pellets. These pellets were dried for four hours in a 120° C. oven, then injection-molded at about 260° C., thereby forming Izod test samples and 50-mm square sheets (thickness, 3 mm). The Izod impact strength, flexural modulus, tensile strength, resistance to chemicals and melt index (MI) of the molded pieces thus obtained were measured, and the appearance of the molded pieces was evaluated. The results are shown in Table 1.

The $\frac{1}{8}$" notched Izod impact strength was measured in accordance with ASTM D256, the flexural modulus was measured in accordance with ASTM D790, the tensile strength was measured in accordance with ASTM D638, and the melt index (MI) was measured in accordance with ASTM D1238 at 250° C. and under a load of 5 kg.

The surface appearance of the molded pieces was evaluated from the surface roughness. The surface roughness was measured with a surface roughness gauge (an all-purpose surface shape-measuring instrument with surface information processing function, model SE-3H; manufactured by Kosaka Kenkyujo KK); the maximum height (R-max), the 10-point average roughness (R-z) and the center-line average roughness (R-a) were determined in accordance with JIS B0601. The measurement distance was set at 2.5 mm, and the average value for 3 measurements was used. A smaller numerical value indicates a smoother surface.

The resistance to chemicals was measured by using a jig to impart a strain of $\frac{1}{2}$% to the $\frac{1}{8}$-inch test pieces used in the Izod impact strength tests according to ASTM D256, then immersing these in carbon tetrachloride and measuring the time until cracks appeared.

ADVANTAGES OF THE INVENTION

Polycarbonate resin compositions having an excellent appearance, good chemical resistance and moldability, and excellent physical properties can be provided according to this invention.

TABLE 1

| | Example 1 | Example 2 | Example 3 | Comparative Example 1 | Comparative Example 2 |
|---|---|---|---|---|---|
| Ingredient (parts by weight) | | | | | |
| PC | — | 20 | 40 | 50 | — |
| CPEC | 50 | 30 | 10 | — | 85 |
| PBT | 35 | 35 | 35 | 35 | — |
| Glass fibers | 15 | 15 | 15 | 15 | 15 |
| Carbon black | 0.4 | 0.4 | 0.4 | 0.4 | 0.4 |
| Izod impact strength (kg/cm·cm) | 10.2 | 9.5 | 10.1 | 10.7 | 15.2 |
| Flexural modulus (kg/cm$^2$) | 43000 | 42500 | 42000 | 43500 | 42000 |
| Tensile strength (kg/cm$^2$) | 910 | 920 | 912 | 922 | 1200 |
| MI (g/10 min) | 35.3 | 22.3 | 14.0 | 11.5 | 30.7 |
| Surface roughness | | | | | |
| R-max (μm) | 2.6 | 3.6 | 3.9 | 5.4 | 4.8 |
| R-z (μm) | 2.0 | 2.5 | 2.7 | 4.2 | 3.5 |
| R-a (μm) | 0.2 | 0.4 | 0.4 | 1.1 | 0.9 |
| Chemical resistance Crack generation time (min) | 4.8 | 5.0 | 5.1 | 5.0 | 0.4 |

We claim:

1. A resin composition comprising
(A) 30–80 parts by weight of a copolyester carbonate consisting essentially of constituent units having the formula:

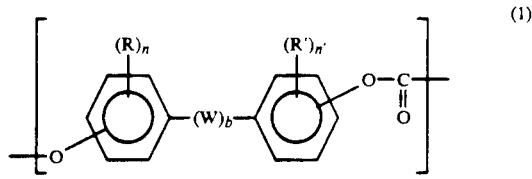

(1)

and the formula:

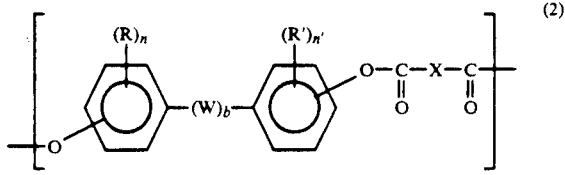

(2)

where R and R' independently represent halogen atoms, monovalent hydrocarbon groups or hydrocarbonoxy groups; W is a divalent hydrocarbon group, —S—, —S—S—, —O—, —S(=O)—, —(O=)S(=O)— or —C(+O); n and n' independently represent integers from 0 to 4; X is a divalent aliphatic group having 6-18 carbons; and b is 0 or 1 and (B) 70-20 parts by weight of aromatic polyester resin consisting essentially of the polycondensation reaction product of an aromatic dicarboxylic acid or an esterforming derivative thereof and a diol or an ester-forming derivative thereof and which contains also:

(C) 60-1 parts by weight of inorganic filler per 40-99 parts by weight of (A)+(B).

2. A composition according to claim 1 wherein said aromatic polyester is selected from the group consisting of polyethylene terephthalate, polybutylene terephthalate, polyethylene naphthalate, polybutylene naphthalate, polyethylene-1,2-bis(phenoxy)ethane-4,4'-dicarboxylate, polycyclohexanedimethanol terephthalate, and polycyclohexanedimethanol isophthalate.

3. A resin composition according to claim 1 wherein said inorganic filler is selected from the group consisting of glass fibers, carbon fibers, graphite fibers, metal fibers, silicon carbide fibers, asbestos, wollastonite and fibrous potassium titanate.

* * * * *